Oct. 4, 1932.  J. J. DALY  1,880,847
WATER GAUGE
Filed June 27, 1931   2 Sheets-Sheet 1

Inventor
John J. Daly
By Dwight B. Galt
Attorney

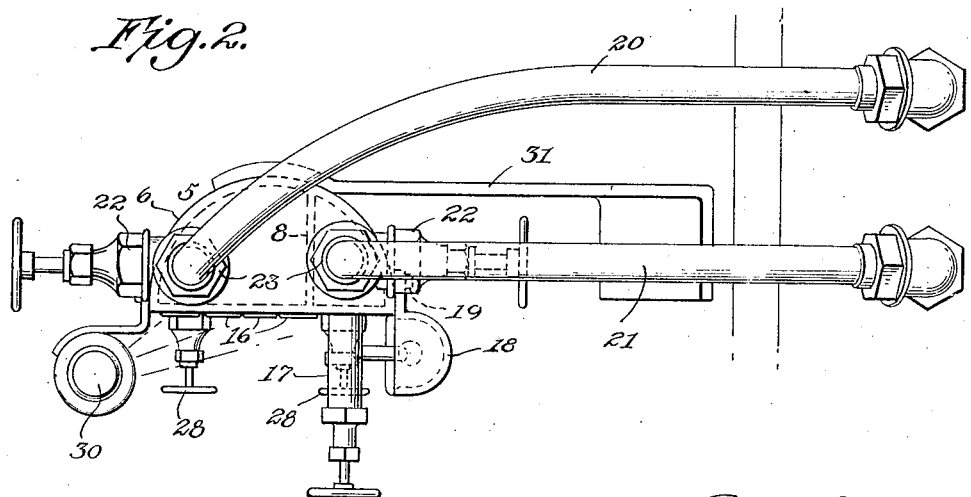
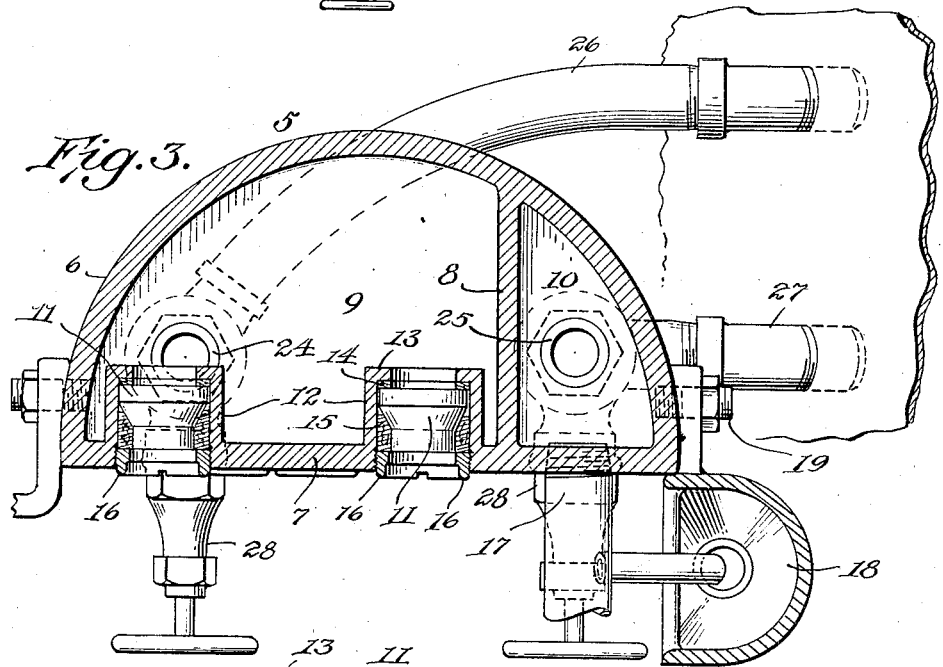
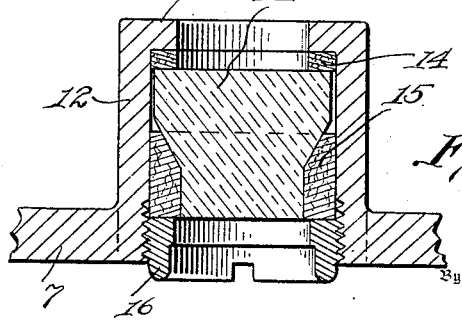

Patented Oct. 4, 1932

1,880,847

UNITED STATES PATENT OFFICE

JOHN J. DALY, OF VIRGINVILLE, PENNSYLVANIA

WATER GAUGE

Application filed June 27, 1931. Serial No. 547,373.

This invention relates to water indicators or gauges, adaptable particularly for use in connection with locomotive or other high pressure boilers.

The primary object of the invention is to provide a water indicator of such character that plural readings or indications may be had at all times, and which is featured by an improved construction which minimizes the opportunity for an unreliable reading and also the accumulation of scale to affect the indicated water level.

A further object of the invention is to provide a water gauge of that character wherein plural indications may be obtained, further characterized by independent communications of each gauge portion with the boiler.

A further object resides in the specific construction of the gauge per se, and wherein the indications of one gauge will in no way affect or be influenced by the pressure in the other gauge.

With these objects in view together with others which will appear as the description proceeds, the invention consists in the novel construction, combination and arrangement of parts, all as will be described more fully hereinafter, illustrated in the drawings and particularly pointed out in the claims:—

In the drawings:—

Fig. 2 is a top plan view of the improved gauge.

Fig. 3 is an enlarged horizontal sectional view taken through the lower part of the indicator, and Fig. 4 is an enlarged fragmentary sectional view taken through one of the sight openings of the gauge.

Figure 1:
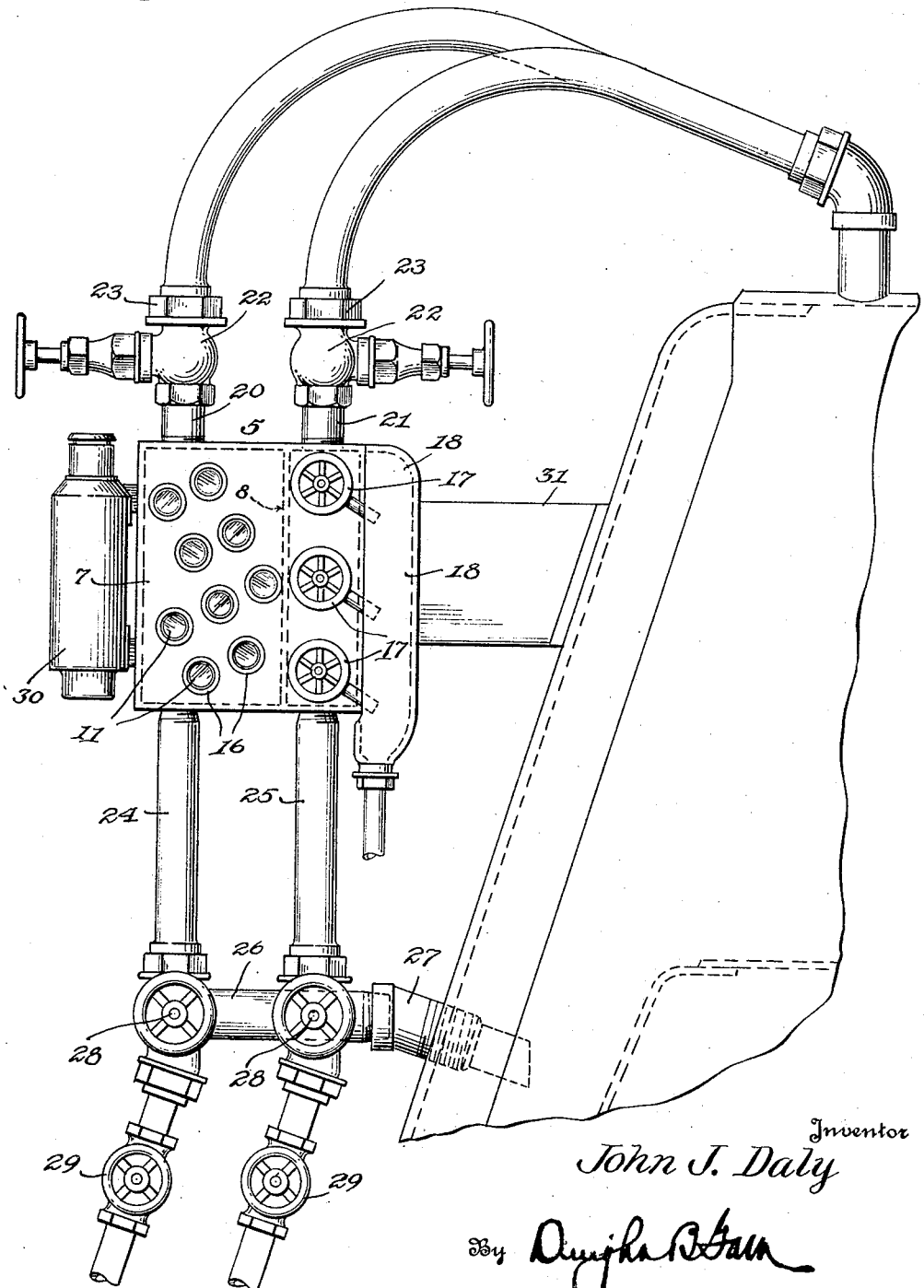
Fig. 1 is an elevation of an improved water gauge embodying the invention and illustrating the same as applied to a conventional type of locomotive boiler.

The invention comprehends generally the arrangement of a double indicator or gauge within a single housing, each gauge being separately connected at its upper and lower ends with upper and lower portions of the boiler, whereby the readings or indications of the gauge portions or sections are independent of each other. There is no communication whatever between these separate gauges, notwithstanding that they are both combined in a unitary structure. The connections establishing communication between the boiler and the separate compartments are considerably larger than those heretofore employed in similar capacity, whereby to insure an uninterrupted flow of both steam and water as well as to minimize the opportunity for the accumulation of scale in the passages. The connections are equipped with valves and are coupled with the gauge member in such manner as to permit of quick and easy cut-offs being established, or the ready disconnection of the entire gauge structure for the purposes of inspection, cleaning or repair. The gauge mechanism per se is mounted upon the boiler in such manner that the leads thereto and therefrom are in no manner subjected to any strain, weight or vibration, as independent and rigid means are employed for securing the gauge in position.

More particularly, the gauge housing is indicated generally at 5 and comprises a structure made of steel of proper gauge and strength to withstand the pressures to which it will be subjected. This housing comprises a rear portion 6 of semi-circular shape in cross-section, having a flat forward face 7. The top and bottom of the housing are closed by heads as will be understood, and a vertically disposed partition, either cast integral with the housing or in the form of a plate 8 welded or otherwise rigidly secured within the housing, provides compartments 9 and 10. In practice, it is believed that the housing if made of proper gauge steel will be sufficiently strengthened by the partition wall 8 to withstand high steam pressures, however, it will be understood that if desired the front and rear walls of the housing may be further strengthened by the application of staybolts thereto.

The front wall 7 of the housing covering the compartment 9 is provided either with a continuous water gauge glass or with a plurality of sight openings arranged progressively in staggered relation from the bottom to the top thereof. Each sight opening is closed by a glass bull's eye, the preferred form of which is shown particularly in Fig. 4. The glass itself is indicated at 11 and is seated within the inwardly projecting lens casing 12 welded or in any other approved manner rigidly secured within an opening in the front face of the said housing plate. The member 12 at its inner extremity is provided with an annular flange 13 against which engages a gasket 14 in contact with the inner extremity of the glass 11. An annular packing member 15 is disposed around the outer end of the glass, and is held tight in engagement with the lens by the ring 16 screwed within the outer end of the member 12. It will be understood that the several sight members are similarly constructed and assembled.

The front wall 7 of the compartment 10 has threaded therein the gauge or try cocks 17, the nozzles of which discharge to the drain funnel or receptacle 18 bolted as at 19 to the housing 5.

The top head of the housing 5 is provided with a pair of suitable openings to receive pipes 20 and 21. The pipe 20 communicates with the interior of the housing 9, while the pipe 21 communicates with the chamber or compartment 10, and each of these pipes, as will be shown particularly in Fig. 2, connects with the upper portion of the boiler individually. Each pipe is equipped with a valve 22, also a quick detachable fitting 23 for obvious purposes.

Each of the compartments 9—10 is provided with a discharge pipe 24—25. These pipes enter the compartment through suitable openings in the bottom of the housing, and each separately communicates as by pipes 26—27 with the boiler below the water level therein. Each pipe is also equipped with a valve 28, while the drains of these pipes are equipped with cocks 29.

The housing 5 has attached thereto by suitable brackets a lamp or illuminating device 30 to shed its rays across the flat face 7 of the housing to facilitate reading the indications after dark.

A bracket 31 is bolted or otherwise rigidly secured to the side of the boiler and supports the housing and its associated pipes, so that the latter is relieved of all strains and stresses due to the weight of the gauge or vibrations incident to the travel of the locomotive.

The piping 20, 21, 24 and 25 is of substantially large size and is free from pockets or corners that might provide places for the accumulation of sediment or scale.

The arrangement is such that the true water level of the boiler may be readily determined through the several sight openings in compartment 9, while an additional indication may be obtained by use of the try or gauge cocks 17. Inasmuch as each compartment has independent pipe connections with the top and bottom of the boiler, it is evident that a true indication of the water level may be obtained whether or not one of the pipes may be closed or stopped.

In instances where a test of the gauge is required, it is but necessary to sever the communication between pipes 26—27 and their respective gauges and open valves 29 whereupon the steam pressure will immediately force the water from the compartments down through pipe 24—25. Should it be required to flush or clean out the gauge, the connections 23 may be taken apart to permit of access being had to the interior of the housing. A wash-out hose may be applied to either compartment if desired. As regards the compartment 9, a bull's eye or lens may be removed to permit of the application of such hose, while the removal of one of the gauge cocks 17 permits of a water connection being made with the compartment 10.

From the foregoing it is obvious that I have provided an extremely simple gauge which will prove highly effective and reliable in practice, which involves the use of but few simple and readily assembled parts, all of which are constructed and arranged in such manner as to insure safety at all times, and yet which may be manufactured and maintained at small cost and at a minimium of trouble.

Having thus described my invention, I claim:—

1. In a water gauge for boilers, a housing, said housing including a pair of compartments each independent of the other, water level determining means for each compartment, and a pair of pipes for each compartment, each pair of said pipes communicate respectively with the upper and lower ends of said compartments.

2. In a water gauge for boilers, a housing including an elongated body having a substantially flat front face and an arcuate rear wall, a partition disposed longitudinally within said housing to divide the latter into separate compartments, water level determining means for each compartment, inlet and outlet pipes for each of said compartments communicating respectively with the lower and upper ends thereof, and said inlet and outlet pipes adapted to be separately connected with the boiler.

In witness whereof, I have hereunto affixed my signature.

JOHN J. DALY.